United States Patent [19]

Wang et al.

[11] Patent Number: 5,077,319

[45] Date of Patent: Dec. 31, 1991

[54] CYANATE RESIN-BASED FOAMS

[75] Inventors: Yen-Seine Wang, San Ramon; Ching-Chi Kuo, Danville; David B. Conway, Pleasant Hill; Frank W. Lee, Danville; Kenneth S. Baron, San Ramon, all of Calif.

[73] Assignee: Hexcel Corporation, Dublin, Calif.

[21] Appl. No.: 524,868

[22] Filed: May 18, 1990

[51] Int. Cl.$^5$ .............................. C08J 9/06; C08J 9/14; C08K 6; C08L 33/00

[52] U.S. Cl. .................................. 521/89; 521/90; 521/94; 521/95; 521/139; 525/534

[58] Field of Search ................ 521/134, 135, 139, 51, 521/89, 90, 94, 95; 525/534

[56] References Cited

U.S. PATENT DOCUMENTS

| | | | |
|---|---|---|---|
| 4,071,481 | 1/1978 | Hanton | 528/147 |
| 4,604,452 | 8/1986 | Shimp | 528/422 |
| 4,798,849 | 1/1989 | Thomas et al. | 521/135 |
| 4,956,393 | 9/1990 | Boyd et al. | 521/86 |

*Primary Examiner*—John Kight, III
*Assistant Examiner*—John Cooney
*Attorney, Agent, or Firm*—Oblon, Spivak, McClelland, Maier & Neustadt

[57] ABSTRACT

Foamable resin compositions of cyanate esters and thermoplastic resins are disclosed.

19 Claims, No Drawings

CYANATE RESIN-BASED FOAMS

BACKGROUND OF THE INVENTION

1. Field of the Invention

The present invention relates to a foamable resin composition comprising a cyanate ester, a thermoplastic resin, a blowing agent(s) and a surfactant, as well as the foamed products produced therefrom.

2. Discussion of the Background

Structural foams are known for their light weight and strength. They can be described as polymer structures which have uniform density cores and integral skins. Structural integrity requires a uniform fine cell distribution within the foam. PMI (polymethacrylimide) and PVC (polyvinylchloride) structural foams are two of the most commonly used in the aerospace industry. However, PMI foam has high affinity for moisture which will attack the foam structure and subsequently reduce the structural integrity of the PMI foam. The moisture resistance of a PVC foam is superior but its thermal stability is poor. A structural foam based on a thermoset resin and a chemical blowing agent is difficult to make due to the difficulty in expanding the resin and stabilizing the expanded cells by curing. Thermoset resins require heating to cure the resins giving the resin strength so a structural foam based on a thermoset resin must be expanded and cured at the same time. It is often that there is a mismatch between the chemical reaction and blowing temperature leading to incompletely expanded or cured foams.

Polycyanurates have reduced moisture absorbance compared to epoxy resins and polyimides. Polycyanurate thermoset compositions are finding uses in a wide variety of industrial applications, however there is a continuing effort to widen the uses for these compositions and to improve their properties, such as toughness. Polycyanurate esters have been modified with high levels of polyester carbonates (U.S. Pat. Nos. 4,157,360 and 4,334,045), acrylonitrile-butadiene copolymer (U.S. Pat. No. 4,649,714), aliphatic polyester resins (U.S. Pat. No. 4,631,319), and amorphous aromatic thermoplastic resins (EP 311341). Such modifying thermoplastic resins include polysulfones, polyether sulfones, polyimides, polyether imides, polyarylates, polyarylformals and polyaryl ethers. Thermosettable compositions based on cyanate esters have been reported of an aromatic cyanate ester, aromatic polycyanurate and an epoxy resin (U.S. Pat. No. 4,612,359) and from a compound which contains both a maleimide and cyanate group (U.S. Pat. Nos. 4,769,440 and 4,820,797).

Polycyanurate esters have been modified with thermoset resins into foaming compositions. A highly heat-resistant foam has been prepared from a polyfunctional maleimide and a polyfunctional cyanate, an epoxy resin and a carboxylic anhydride J59-226,031). Such a composition does not provide a toughened system and does not overcome the problem of moisture affinity which are characteristics of structured foams to date. It would be desirable to combine the low moisture absorbance of polycyanurate esters with the toughness of a thermoplastic polymer in a structural foam.

Despite the good mechanical properties of thermoplastic modified polycyanurate esters, no one has yet developed a structural foam exhibiting good toughness and structural properties based on a cyanate ester.

SUMMARY OF THE INVENTION

Accordingly, one object of this invention is to provide a novel foamable resin composition comprising a cyanate ester, a thermoplastic resin, a blowing agent and a surfactant.

Another aspect of the present invention concerns the foamable resin composition where the blowing agent is also used as a catalyst for the cyanate cure.

A further aspect of the present invention concerns the casting of a foamable resin composition as a film which can later be foamed.

A further aspect of the present invention concerns the foamed products resulting from foaming the formable castable film.

A cyanate ester monomer is combined with a thermoplastic toughening agent, which thermoplastic also lends viscosity control to the mixture. The mixture is provided with a blowing or foaming agent and a catalyst for the cyanate ester cure, which catalyst and foaming agent operate at about the same temperature. The blowing agent and the catalyst may be one and the same compound. The mixture is additionally provided with a minor amount of surfactant.

The mixture may be prepolymerized and cast or extruded as a precursor film. The precursor film may, if desired, be B-staged to give a foam precursor having higher viscosity. If desired, a plurality of the precursors may be laminated, and foamed together. Upon foaming, owing to excellent wettability, a monolithic structural foam is formed, without any evidence of separation between precursor layers. The resulting structural foam has a high compressive strength, with excellent density values, and a fine uniform cell distribution. Density can be controlled by viscosity, and by selection of appropriate amount of foaming agent and catalyst additions. A reduced viscosity, or enhanced foaming, leads to a lower density product, while a more active catalyst promotes more rapid polymerization, preventing full foaming, and yielding a higher density.

DETAILED DESCRIPTION OF THE PREFERRED EMBODIMENTS

This invention provides a polycyanurate ester foaming resin composition of low moisture absorbance and high mechanical strength. These compositions are suitable for many foaming applications. Procedures for making and foaming the cyanate ester foaming resin compositions are also provided.

The cyanate ester resins used in the present invention offer certain pendent advantages. In addition to providing toughness and low moisture absorption, the cyanate esters offer a glass transition temperature (Tg) of between 240°–290° C., while exhibiting self curing properties and low toxicity. The cyanate ester resins of the present invention are exemplified by but not limited to cyanate ester resins such as L-10 made by Hi-Tek Polymer.

In general, the cyanate esters of the invention will have the following chemical structure (I)

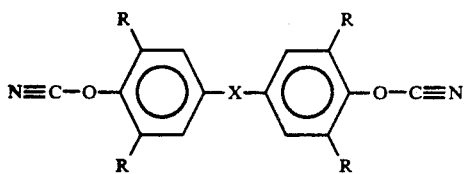

wherein each R may be the same or different and is selected from the group H, $C_{1-6}$ alkyl, $C_{1-6}$ alkoxy, phenyl, mono-, di- and tri-substituted phenyl, halogen, aryl, aryloxy, nitro, thio and a carboxylic acid moiety, or other group not autoreactive, and wherein X is any bisphenol linking group, including alkyls, cycloalkyls, S, O, N or other divalent molecules, fused ring systems, etc. As exemplary cyanate esters, the following are advanced.

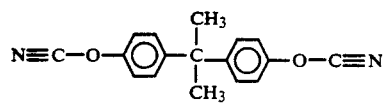

AROCY B-10, Hi-Tek

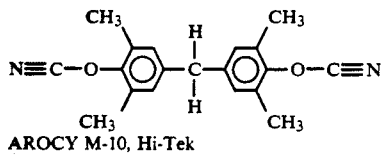

AROCY M-10, Hi-Tek

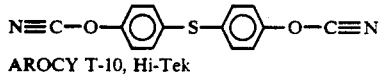

AROCY T-10, Hi-Tek

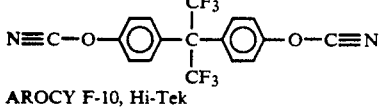

AROCY F-10, Hi-Tek

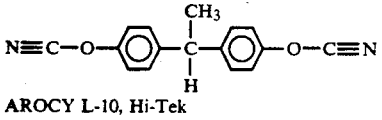

AROCY L-10, Hi-Tek

XU 71787.00L, DOW Chemical

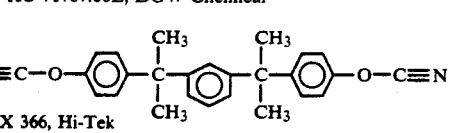

RTX 366, Hi-Tek

The amount of cyanate ester present ranges from 5-95%, by weight of the total preformed mixture. A preferred range is 50-90% by weight.

In order to obtain a uniform distribution of fine cells in the foamed product, it is beneficial to add a thermoplastic to control the viscosity of the mixture during the foaming. The toughness of the cyanate foam is also improved significantly with the presence of a thermoplastic. Any compatible thermoplastic may be added. The percentage of thermoplastic is ranged from 1 to 90 percent by weight and 5 to 50 percent by weight is preferred.

A compatible thermoplastic is added into the system to improve the mechanical properties of the cyanate foam. Virtually any compatible thermoplastic, including polyvinyl butyrals, polysulfones, polyether sulfones (PES), polyimides, polyacrylates, polyether ethylketones, polyetherimides, polyvinyl formals, polyethylene oxides, copolyesters, etc. can be employed. A preferred thermoplastic is PES.

The addition of thermoplastic to the polycyanurate resin also provides important processing advantages. Signal amongst these is the ability to cast a precursor film which has sufficient structural integrity that it may be prepared, transported, manipulated and then subsequently foamed. In addition to the obvious commercial advantages in a solid, transportable film precursor of a structural foam, the excellent wettability of the subject of this application allows one to foam multiple precursor films simultaneously, to reach any necessary foamed dimension. As they are generally somewhat tacky, the films may simply be layered, and subsequently foamed, according to the conditions set forth herein. Upon completion of foaming, a monolithic foam structure is provided, of the necessary dimension. This is a distinct advantage and improvement over prior art processes, which require preparation of a foam larger than the total shape, and subsequent machining. Necessary machining is reduced to a minimum by using the claimed invention.

To achieve these objects, it is important that the thermoplastic be intricately mixed with the thermoset polycyanurate resin. To this end, it is frequently desirable to dissolve the thermoplastic in the thermosetting resin liquid. At relatively low loadings of thermoplastic, this may not be a problem. However, certain thermoplastics, such as PES, are difficult to dissolve in the thermoset resins, particularly at high loadings. In general, loadings of 30-50% are preferred for high compressive strength. To achieve such enhanced loadings, and maintain a highly intimate mixture, it may be necessary to use micropulverized PES or other thermoplastic, that is, thermoplastic having a reduced size of about 5-100 microns, in average diameter. The use of larger diameter particles will result in highly incomplete solubilization, and moreover, during the foaming/curing process, will result in heat variation, leading to potential incompletely cured locations, or irregular curing.

With certain thermoplastics, and in order to achieve the highest possible compressive strengths, it may be valuable to provide thermoplastics with reactive terminal groups. For the polycyanurate resins, thermoplastics having a terminal group with an active hydrogen such as $NH_2$, COOH, phenol, OH and related end groups may be suitable. Amongst the various terminal groups, hydroxyl groups are preferred for the achievement of high compressive strengths.

It should be noted that the addition of the thermoplastic toughening agent lends a large degree of processing control, by alteration of the viscosity of the mix. Again, addition of thermoplastic above loadings of 30% or so (by weight) results in a significant increase in the viscosity of the prepolymer mix. Viscosity must be balanced. Too high a viscosity slows cell expansion, as foaming occurs during curing. This leads to a fairly high density foam. On the other hand, if viscosity is very low, the cells formed will collapse during the blowing process. Preferred viscosity ranges vary greatly from application to application and thermoplastic to thermoplastic, but can be easily determined by trial and error. Where high loadings of thermoplastic are desired, but increasing viscosity becomes a problem, it is intended to process the mix with less-than-complete solubilization of the thermoplastic addition. When the thermoplastic is not entirely solubilized, a mixture with desired viscosity can be obtained. Particularly when the micropulverized thermoplastic described above is employed, even if it is not completely solubilized in the monomer mix, apparently, additional solubilization of the thermoplastic occurs during the foaming/curing process.

The mixture must be simultaneously foamed and cured to obtain the inventive structural foam. In one embodiment, a blowing agent which also functions as a catalyst for the cyanate cure may-be employed. Azodicarbonamide is representative. Unlike other thermoset and blowing agent systems, this blowing agent matches the cure of the cyanate systems such that decomposition of the blowing agent occurs at a temperature compatible with the curing of the cyanate ester resin. This allows for the creation of uniform cells in the resin while stabilizing the cells through resin curing. A low percentage of surfactant is added to ensure cell homogeneity. Alternatively, chemical and/or physical blowing agents may be used with the preferred catalyst, or other suitable catalysts, including metallic ions.

As blowing agents, there are selected compounds which will decompose to foam and expand cells in the resin while also initiating the cure of the cyanate ester resin. It is important that cell expansion and resin cure occur within a compatible temperature range. As exemplary foaming agent/catalysts, there exists foaming agents which generate gas at high temperature to foam the product, such as 5-phenyltetrazole and p-toluenesulfonyl semicarbazide. Other examples include urea, dimethylurea and formamide. Azodicarbonamide is preferred due to its compatibility and catalytic effect on the matrix system. The blowing agent content ranges from 0.1% to 15% by weight and is preferred in between 1% to 7% by weight.

In an alternative embodiment, another foaming agent, which does not catalyze curing of the resin, is substituted in part for the foaming agent catalyst in the system. For example, ethylene carbonate, which decomposes at temperatures between about 120°-190° C. is compatible with this innovative system. It serves as a blowing agent without curing effect on the resin. Any blowing agent which functions at temperatures between about 120°-190° C. while not catalyzing curing of the resin is acceptable. For example propylene carbonate can be used. This allows for an increased expansion of the resin without accelerating the rate of curing.

In general, the density of a blown foam is controlled by the amount of blowing agent added to the system. Increased levels of the azodicarbonamide will cause problems due to the catalytic effect on the cyanate cure resulting in an accelerated rate of cure and an increase in the exotherm of the reaction. By replacing some azodicarbonamide with ethylene carbonate, these effects during the cure can be reduced while increasing the expansion of the resin. This unique foaming agent-/curing catalyst system, allows for the control of the exothermic reaction of curing the cyanate ester by varying the ratio of azodicarbonamide to ethylene carbonate, while still controlling the foam density, thickness and cell size. Densities of the inventive foam range from about at least 3.0 pounds per cubic foot to values above 10 or 12 pounds per cubic foot, where necessary. Compressive strengths will vary greatly from about 60-290 psi at densities up to about 7.0 pounds per cubic foot, on up to about 300-400 psi or higher for higher densities, all as measured at ambient room temperature.

The flexibility of the inventive system is such that one may use, as an alternate curing/foaming agent, a separate catalyst and blowing agent, rather than the foaming agent/curing catalyst discussed above. Thus, if desired, the azodicarbonamide of the preferred embodiment may be dispensed with entirely. Alternate catalysts for polycyanurate resins are known, and will be useful in the claimed invention. Prominent amongst these catalysts are metal ions, particularly the transition metal ions. Preferred amongst the transition metal ions is copper, although other transition elements, including iron, nickel, cobalt, zinc and the like may also be used. It is a requirement that the catalyst be soluble. Particularly where metal ions are to be used, the catalyst may be solubilized by using an organic solvent system, exemplary among these being a nonylphenol. Alternative catalysts include compounds exhibiting active hydrogens, and monofunctional hydrophobic alcohols, that catalyze the polycyanurate cure.

Where the catalyst is not simultaneously a blowing agent, other blowing agents, effective at the catalyst cure temperature, must be added. These may be used alone, or in combination with the blowing agents discussed above. Physical blowing agents (solvent systems) can also be employed, when desired. Examples of such physical blowing agents include acetone, methylene chloride and the like. When using physical blowing agents, caution must be exercised, as the solvents lower the viscosity of the mix and effect performance.

As noted, it is desirable to use a surfactant in combination with the claimed invention. The surfactant controls the size of the cells of the foamed product, by releasing the surface tension of the bubbles formed during blowing. Virtually any surfactant compatible with the system can be used. Among exemplary surfactants are included silicones, anionic surfactants (e.g., carboxylates), nonionic surfactants (e.g., polyoxyethylene), cationic surfactants (e.g., N-alkyltrimethylenediamine), amphoteric surfactants (generally, zwitterions) etc.

The surfactant ranges from 0.01 to 5 in percent by weight. A preferred range is 0.01 to 0.5% by weight. Without the surfactant, the foamed product would have coarser cells. Polysiloxane surfactants such as DC-193 by Dow Corning have been shown to be suitable.

An intensive mixing of the formulation for a short period of time is required in order to disperse the blowing agent and surfactant into the system uniformly. A substantial fraction of the thermoplastic resin will dissolve into the cyanate system and the viscosity of the mixture will increase during the mixing. The mixture can be cast into a thin film with mechanical integrity. The amount of thermoplastic that can be added will be in general limited by viscosity consideration.

The foaming procedures include the compounding of the formulation, mixing the mixture at elevated temperature, casting the mixture into a film precursor and finally foaming the film precursor into the final product. The mixing is performed at between 15°-150° C. and the mixing time is strongly dependent on the mixing temperature. In general, the mixing time is between 5-60 minutes. The foaming process is achieved by placing the foam precursor into a mold, and heating it to 150°-230° C. for 1-2 hours to expand and cure the system. A post cure of the foam will further cure the foamed product and improve the performance. The post cure can be achieved by extending the cure time to 2-8 hours at the 200°-220° C.

The final foamed product can be used in applications where lightweight, high temperature stability, and moisture resistance are required. It can be used as a film adhesive/film tape for sandwich construction where a honeycomb is bonded to two face sheets. With the addition of conductive fillers into the film precursor, it can be foamed to conductive foam. Due to its low dielectric constant, the foam can also be used as a low conductive foam. The foam precursor can be expanded in one dimension to fill a honeycomb core or odd shape structure.

The foaming composition of the present invention has the unique high mechanical strength of a thermoplastic reinforced cyanate resin incorporated into the structural foam.

The foaming composition of the present invention offers distinct processing advantages over prior foaming compositions. The foaming compositions can be cast to a flexible foam precursor which can be shaped then foamed. The flexible precursor is easily prepared as a cast or extruded film of 3-50 mils thickness. This film can be B-staged further at about 120°-150° C. for 5-60 minutes to meet the process requirements including viscosity and exotherm control. Several layers of flexible foam precursors can be laminated and foamed into a rigid sheet. Other features of the invention will become apparent in the course of the following descriptions of exemplary embodiments which are given for illustration of the invention and are not intended to be limiting thereof.

EXAMPLE 1

This shows the basic formulation within the scope of this invention.

| L-10 | 58.51 parts | Cyanate ester from Hi-Tek |
| --- | --- | --- |
| PES | 39.00 parts | Thermoplastic from ICI |
| Azodicarbonamide | 2.34 parts | Blowing agent/catalyst from Uniroyal |
| DC-193 | 0.15 part | Surfactant from Dow Corning |

The formulation was mixed at 150° C. for 15 minutes and then deaired for 2 minutes. The precursor film from this mixture was B-staged at 150° C. for 10 minutes and then foamed at 200° C. for 60 minutes. This produced a yellow foam material with a density of 5.2 pounds per cubic foot (PCF). The cells were very fine and uniform. This sample has a compressive strength of 191.2 psi at ambient temperature.

EXAMPLE 2

Another formulation within the scope of this invention is as follows.

| L-10 | 58.69 parts |
| --- | --- |
| PES | 39.12 parts |
| Azodicarbonamide | 2.14 parts |
| DC-193 | 0.05 part |

The formulation was mixed at 150° C. for 25 minutes and was then deaired for 2 minutes. The precursor was B-staged at 150° C. for 10 minutes and then foamed at 210° C. for 2 hours. This foamed material had a uniform structure of fine cells and a foam density of 6.03 pounds per cubic foot.

EXAMPLE 3

Another formulation within the scope of this invention was used.

| L-10 | 58.28 parts |
| --- | --- |
| PES | 38.85 parts |
| Azodicarbonamide | 2.72 parts |
| DC-193 | 0.15 part |

The formulation was mixed at 150° C. for 15 minutes and then deaired for 2 minutes. The precursor was B-staged at 150° C. for 10 minutes and then foamed at 200° C. for one hour and one hour at 220° C. The foamed product made from this precursor had uniform fine cells and a density of 4.93 pounds per cubic foot. Another foamed sample (4.74 pounds per cubic foot) was placed in humidity cabinet at 50° C. with RH at 79% for 9 days. The moisture absorption is about 1.06%.

EXAMPLE 4

Another formulation within the scope of this invention is as follows.

| L-10 | 63.38 parts |
| --- | --- |
| PES | 34.13 parts |
| Azodicarbonamide | 2.44 parts |
| DC-193 | 0.05 part |

The formulation was mixed at 150° C. for 50 minutes and then deaired for 5 minutes. The precursor was B-staged at 150° for 10 minutes and then was foamed at 210° C. for 3 hours. The foamed product has uniform cell structure and a density of 5.64 pounds per cubic foot.

EXAMPLE 5

Another example within the scope of this invention is as follows.

| L-10 | 58.77 parts |
| --- | --- |
| PES | 39.18 parts |
| Azodicarbonamide | 1.96 parts |
| DC-193 | 0.09 part |

The formulation was mixed at 150° C. for 15 minutes and then deaired for 1 minute. The precursor was foamed at 210° C. for 1 hour and then 1 hour at 220° C. The foamed sample had uniform and fine cells and a density of 6.04 pounds per cubic foot. The compressive strength of this sample at 80° C. was about 195 psi. It retained 87% of its original strength.

EXAMPLE 6

A comparative example of a cyanate foam made with a low percentage of PES.

| B-50 | 90.10 parts |
| --- | --- |
| PES | 5.37 parts |
| Azodicarbonamide | 3.58 parts |
| DC-193 | 0.95 part |

The formulation was mixed at room temperature. The powder mixture was foamed at 183° C. for 2 hours.

The cells were larger than the foam made with higher percentage of PES. This foam had a compressive strength of 80 psi with a density of 5.66 pounds per cubic foot. The compressive strength is lower than the sample made with a high percentage of PES, see Examples for comparison.

EXAMPLE 7

Another example of cyanate foam within the scope of this invention.

| L-10 | 39.00 parts | |
| --- | --- | --- |
| B-10 | 24.38 parts | (Cyanate ester from Hi-Tek) |
| PES | 34.13 parts | |
| Azodicarbonamide | 2.34 parts | |
| DC-193 | 0.15 part | |

This formulation had two different cyanate esters, L-10 and B-10. B-10 is a solid at room temperature. The formulation was mixed at 150° C. for 15 minutes and then deaired. The foam precursor was B-staged at 150° C. for 10 minutes and then foamed at 195° C. and then postcured at 210° C. for 16 hours. The foamed product had uniform and fine cells. The density of the foam is about 5.28 pcf.

EXAMPLE 8

An example of a conductive foamed product within the scope of the invention is shown.

| L-10 | 57.00 parts |
| --- | --- |
| PES | 38.00 parts |
| Azodicarbonamide | 1.90 parts |
| DC-193 | 0.10 part |
| Carbon Black | 3.00 parts |

The addition of carbon black is to improve the conductivity. The precursor was B-staged at 150° C. for 10 minutes and then foamed at 220° C. for 1 hour. The conductive foamed product had fine and uniform cells. The density of the foam is around 6.55 pcf.

EXAMPLE 9

A cyanate foam with lower density was made with an alternative approach, including a second non-catalytic blowing agent. The formulation was mixed at 150° C. for 10 minutes and then deaired for 2 minutes. The precursor was B-staged at 40° C. for 10 minutes and then foamed at 200° C. for 90 minutes. The foamed sample has uniform cells and a foam density of 3.44 pounds per cubic foot.

| L-10 | 51.35 parts |
| --- | --- |
| PES | 42.02 parts |
| Azodicarbonamide | 2.80 parts |
| ethylene carbonate | 3.73 parts |
| DC-193 | 0.10 part |

EXAMPLE 10

The foaming/curing can also be completed with the presence of other catalyst. In this example, copper acetylacetonate/nonylphenol is added as a catalyst The L-10, azodicarbonamide, DC-193 and catalyst were mixed at 100° C. for 10 minutes. The PES was added to the mixture, the mixture was mixed for two additional minutes and then deaired. The precursor from this mixture was B-staged at 120° C. for 30 minutes and then foamed at 178° C. for 90 minutes.

The foam has a density of 3.51 pcf.

| L-10 | 61.85 parts |
| --- | --- |
| Azodicarbonamide | 3.81 parts |
| DC-193 | 0.95 part |
| PES | 33.30 parts |
| Catalyst* | 0.09 part |

*a mixture of copper acetylacetonate and nonylphenol at 1 to 10 in weight ratio

EXAMPLE 11

In this example, the methyl isobutyl ketone (MIBK) (physical blowing agent) and azodicarbonamide were used as foaming agents. The boiling point of methyl isobutyl ketone is around 116° C. The mixtures was mixed at 150° for 10 minutes and then deaired. The precursor was B-staged at 140° C. for 10 minutes and then foamed at 205° C. for one hour. The foam had uniform fine cells and a density of 4.12 pounds per cubic foot.

| L-10 | 57.64 parts |
| --- | --- |
| PES | 38.42 parts |
| Azodicarbonamide | 1.92 part |
| DC-193 | 0.10 part |
| MIBK | 1.92 parts |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mixture capable of being simultaneously cured and formed into a structural foam, comprising:
   (a) 5–63.38% by weight cyanate ester,
   (b) 34.13–90% by weight thermoplastic polymer selected from the group consisting of polysulfones, polyethersulfones, polyimides, polyacrylates, polyetherethylketones, polyetherimides, polyvinylformals and mixtures thereof,
   (c) 0.1–15% by weight blowing agent selecting from the group consisting of 5-phenyltetrazole, p-toluenesulfonyl semicarbazide, azodicarbonamide, urea, dimethylurea, formamide and mixtures thereof, and
   (d) 0.1–5.0% by weight surfactant.

2. The mixture of claim 1, wherein said catalyst is azodicarbonamide.

3. The mixture of claim 1, wherein said thermoplastic is comprised, at least partially, of molecules terminated in an end group having an active hydrogen.

4. The mixture of claim 3, wherein said end group is selected from the group consisting of $NH_2$, COOH, phenol, OH and mixtures thereof.

5. The mixture of claim 4, wherein said end group is comprised of OH.

6. The mixture of claim 1, wherein said thermoplastic is micropulverized, having an average particle diameter of 5–100 microns.

7. The mixture of claim 6, wherein said thermoplastic is substantially dissolved in said mixture.

8. A B-staged film precursor of a structural foam, prepared by heating the mixture of claim 1 at a temperature of 15°-150° C. for a period of 5-60 minutes, preparing a film of said heated mixture, and heating it to a temperature sufficient to B-stage said film.

9. The precursor of claim 8, wherein said film is B-staged by heating at a temperature of 80°-150° C. for period of 5-50 minutes.

10. The precursor of claim 8, wherein said surface is sufficiently tacky that a plurality of said precursors may be layered together, and subsequently foamed to form a monolithic structural foam.

11. The film precursor of claim 8, wherein substantially all of said thermoplastic is dissolved in said film.

12. A structural foam comprised of polycyanurate in an amount of 5-63.38% by weight, with thermoplastic added thereto in an amount of 34.13-90% by weight, said thermoplastic being selected from the group consisting of polysulfones, polyethersulfones, polyimides, polyacrylates, polyetherethylketones, polyetherimides, polyvinylformals and mixtures thereof, said foam having a uniform fine cell structure, a compressive strength of at least about 50 psi, and a density of at least about 3.0 pcf.

13. The structural foam of claim 12, wherein said thermoplastic is present in 30-50%, by weight.

14. The structural foam of claim 12, wherein said thermoplastic comprises a terminal group having a reactive hydrogen.

15. The foam of claim 12, wherein said thermoplastic is a polyether sulfone thermoplastic with terminal groups an OH moiety.

16. The structural foam of claim 12, wherein said polycyanurate is comprised of cyanate esters of the formula

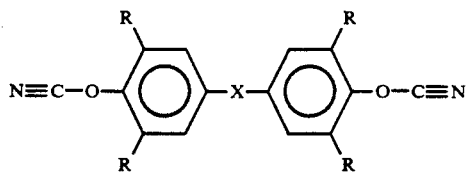

wherein each R may be the same or different and is selected from the group consisting of H, $C_{1-6}$ alkyl, $C_{1-6}$ alkoxy, phenyl and mono, di and tri-substituted phenyl wherein the substituents may be drawn from the non-phenyl identities for R, halogen, aryl, aryloxy, nitro or thio groups bearing an alkyl, aryl or alkyloxy group, and a carboxylic acid group, and wherein x is any bisphenol linking group.

17. A method of preparing a structural foam, comprising mixing a cyanate ester with a thermoplastic resin, said cyanate ester being present in an amount of 5-95%, by weight, and said thermoplastic being present in an amount of 1-90%, by weight, together with a surfactant in an amount of 0.01-5.0%, by weight, and a catalyst and blowing agent, totaling up to 15%, by weight, said mixing being conducted at a temperature of 15°-150° C. for a period of 5-60 minutes to form a foam precursor, thereafter casting the resultant mixture as a thin film and B-staging said thin film at 120°-150° C. for a period of 5-50 minutes, heating said B-staged foam precursor to a temperature of 150°-230° C. for a period of 1-2 hours, and recovering said foam.

18. The process of claim 17, further comprising postcuring said foam at a temperature of 200°-220° C. for a period of 2-8 hours.

19. The process of claim 17, wherein said thermoplastic is added in the form of micropulverized particles having an average particle dimension of 5-100 microns.

* * * * *